United States Patent
Takeyama et al.

(10) Patent No.: US 11,161,946 B2
(45) Date of Patent: *Nov. 2, 2021

(54) METHOD OF PRODUCING COMPOSITE RESIN MATERIAL AND METHOD OF PRODUCING SHAPED PRODUCT

(71) Applicant: ZEON CORPORATION, Chiyoda-ku Tokyo (JP)

(72) Inventors: Yoshihisa Takeyama, Tokyo (JP); Shigeru Shuto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 377 days.

This patent is subject to a terminal disclaimer.

(21) Appl. No.: 16/335,823

(22) PCT Filed: Sep. 27, 2017

(86) PCT No.: PCT/JP2017/034979
§ 371 (c)(1),
(2) Date: Jun. 13, 2019

(87) PCT Pub. No.: WO2018/066433
PCT Pub. Date: Apr. 12, 2018

(65) Prior Publication Data
US 2020/0024409 A1    Jan. 23, 2020

(30) Foreign Application Priority Data

Oct. 3, 2016 (JP) .............................. JP2016-195980

(51) Int. Cl.
| | | |
|---|---|---|
| *C08J 3/215* | (2006.01) | |
| *C08J 5/00* | (2006.01) | |
| *C08K 3/04* | (2006.01) | |
| *C08J 3/00* | (2006.01) | |
| *C08J 3/09* | (2006.01) | |
| *C08J 5/04* | (2006.01) | |

(52) U.S. Cl.
CPC .............. *C08J 5/005* (2013.01); *C08J 3/005* (2013.01); *C08J 3/092* (2013.01); *C08J 3/095* (2013.01); *C08J 5/042* (2013.01); *C08K 3/041* (2017.05); *C08J 2327/18* (2013.01); *C08K 2201/001* (2013.01); *C08K 2201/003* (2013.01); *C08K 2201/004* (2013.01); *C08K 2201/006* (2013.01)

(58) Field of Classification Search
CPC ... C08J 5/005; C08J 3/005; C08J 3/092; C08J 3/095; C08J 5/042; C08J 2327/00; C08J 3/215; C08J 3/122; C08K 3/041; C08K 2201/001; C08K 2201/003; C08K 2201/004; C08K 2201/006

USPC .......................................................... 524/496
See application file for complete search history.

(56) References Cited

U.S. PATENT DOCUMENTS

| | | | |
|---|---|---|---|
| 10,414,896 B2 * | 9/2019 | Komatsu ................. | C08K 7/06 |
| 2008/0318049 A1 | 12/2008 | Kenji et al. | |
| 2012/0241692 A1 | 9/2012 | Takeru et al. | |
| 2018/0208738 A1 | 7/2018 | Masaaki et al. | |
| 2019/0276613 A1* | 9/2019 | Takeyama ................ | C08K 3/04 |

FOREIGN PATENT DOCUMENTS

| | | |
|---|---|---|
| CN | 107849328 A | 3/2018 |
| JP | 2010189621 A | 9/2010 |
| JP | 2015030821 A | 2/2015 |
| WO | 2006011655 A1 | 2/2006 |

OTHER PUBLICATIONS

Apr. 9, 2019, International Preliminary Report on Patentability issued in the International Patent Application No. PCT/JP2017/034979.

Dec. 26, 2017, International Search Report issued in the International Patent Application No. PCT/JP2017/034979.

* cited by examiner

*Primary Examiner* — Hannah J Pak
(74) *Attorney, Agent, or Firm* — Kenja IP Law PC

(57) ABSTRACT

Provided is a method of producing a composite resin material that has excellent shapeability and enables supply of a shaped product having good properties. The method of producing a composite resin material includes: a mixing step of mixing a fluororesin, fibrous carbon nanostructures, and a dispersion medium to obtain a slurry; and a formation step of removing the dispersion medium from the slurry and forming a particulate composite resin material. The particulate composite resin material has a D50 diameter of at least 20 μm and not more than 500 μm and a D90 diameter/D10 diameter value of at least 1.2 and not more than 15. The D10 diameter, D50 diameter, and D90 diameter are particle diameters respectively corresponding to cumulative volumes of 10%, 50%, and 90% calculated from a small particle end of a particle diameter distribution of the particulate composite resin material.

7 Claims, No Drawings

METHOD OF PRODUCING COMPOSITE RESIN MATERIAL AND METHOD OF PRODUCING SHAPED PRODUCT

TECHNICAL FIELD

The present disclosure relates to a method of producing a composite resin material and a method of producing a shaped product, and, in particular, relates to a method of producing a composite resin material containing a fluororesin and fibrous carbon nanostructures, and a method of producing a shaped product using the composite resin material.

BACKGROUND

Fibrous carbon nanostructures such as carbon nanotubes (hereinafter, also referred to as "CNTs") are being investigated for use in a wide range of applications due to excelling in terms of electrical conductivity, thermal conductivity, sliding properties, mechanical properties, and so forth.

Moreover, in recent years, development has been ongoing in relation to techniques for exploiting the excellent properties of fibrous carbon nanostructures by combining resin materials and fibrous carbon nanostructures in order to provide composite resin materials that have both resin properties, such as processability and strength, and fibrous carbon nanostructure properties, such as electrical conductivity.

For example, PTL 1 describes a method of producing composite resin material particles having, at the surface thereof, a dispersed/mixed layer in which fibrous carbon nanostructures are dispersed in a resin material. In the method, a composition containing resin material particles, fibrous carbon nanostructures, a solvent, and liquid carbon dioxide is subjected to ultrasound treatment under specific conditions, and subsequently the liquid carbon dioxide is evaporated and the solvent is volatilized under reduced pressure. According to PTL 1, so long as the obtained composite resin material particles are a powder of 100 μm or less in diameter, it is possible to form a dense conductive network in a shaped product during shaping and thereby ensure high electrical conductivity.

CITATION LIST

PTL 1: JP 2010-189621 A

SUMMARY

Technical Problem

However, when a shaped product of a desired shape has been produced through shaping of the composite resin material described in PTL 1, problems such as surface roughness, shaping unevenness, and warping have occurred in the obtained shaped product. In other words, there is room for improvement of the conventional composite resin material described above in terms of increasing shapeability of the composite resin material so as to provide a shaped product having good properties.

Accordingly, one objective of the present disclosure is to provide a method of producing a composite resin material that has excellent shapeability and enables supply of a shaped product having good properties.

Another objective of the present disclosure is to provide a method of producing a shaped product having good properties.

Solution to Problem

The inventors conducted diligent investigation in order to achieve the objectives described above. As a result, the inventors discovered that when obtaining a composite resin material by preparing a slurry containing a fluororesin, fibrous carbon nanostructures, and a dispersion medium and then removing the dispersion medium from the slurry, it is possible to enhance shapeability of the composite resin material and enable supply of a shaped product having good properties by forming the composite resin material in a particulate form having a specific particle diameter distribution. In this manner, the inventors completed the present disclosure.

Specifically, the present disclosure aims to advantageously solve the problem set forth above by disclosing a method of producing a composite resin material comprising: a mixing step of mixing a fluororesin, fibrous carbon nanostructures, and a dispersion medium to obtain a slurry; and a formation step of removing the dispersion medium from the slurry and forming a particulate composite resin material, wherein the particulate composite resin material has a D50 diameter of at least 20 μm and not more than 500 μm and a D90 diameter/D10 diameter value of at least 1.2 and not more than 15, where the D10 diameter, D50 diameter, and D90 diameter are particle diameters respectively corresponding to cumulative volumes of 10%, 50%, and 90% calculated from a small particle end of a particle diameter distribution of the particulate composite resin material. A particulate composite resin material obtained in this manner that has a D50 diameter and a D90 diameter/D10 diameter that are within the ranges set forth above has excellent shapeability and can be used to obtain a shaped product having good properties.

When a composite resin material is described as "particulate" in the present disclosure, this means that the aspect ratio thereof, as obtained by measuring the major diameters and the minor diameters of 100 arbitrarily selected particles and then dividing an average value of the major diameters by an average value of the minor diameters, is at least 1 and less than 3.

Moreover, the "D10 diameter", "D50 diameter", and "D90 diameter" of a particulate composite resin material referred to in the present disclosure can be determined from a particle diameter distribution acquired through dry measurement using a laser diffraction/scattering particle diameter distribution measurement apparatus.

In the presently disclosed method of producing a composite resin material, the mixing step preferably includes: a premixing step of mixing the fluororesin, the fibrous carbon nanostructures, and the dispersion medium to obtain a premixed liquid; and a dispersing step of subjecting the premixed liquid to dispersion treatment using a wet disperser to obtain a slurry. By preparing the slurry through the steps set forth above, dispersibility of the fluororesin and the fibrous carbon nanostructures in the slurry can be increased, and shapeability of the composite resin material can be further improved.

For the presently disclosed method of producing a composite resin material, the wet disperser is preferably a wet medialess disperser. By preparing the slurry using a wet medialess disperser, dispersibility of the fluororesin and the fibrous carbon nanostructures in the slurry can be further increased, and shapeability of the composite resin material can be even further improved.

The wet medialess disperser is more preferably a homogenizer or an inline mixer.

For the presently disclosed method of producing a composite resin material, content of the fluororesin in the slurry is preferably at least 1 mass % and not more than 30 mass %. When the content of the fluororesin is within the range set forth above, dispersibility of the fluororesin and the fibrous carbon nanostructures in the slurry can be increased, and shapeability of the composite resin material can be further improved.

For the presently disclosed method of producing a composite resin material, the fluororesin is preferably fluororesin particles. Shapeability of the composite resin material can be further improved by using fluororesin particles having excellent dispersibility in the slurry.

Note that the aspect ratio (major diameter/minor diameter) of the fluororesin particles is normally at least 1 and not more than 10.

The dispersion medium is preferably at least one selected from the group consisting of cyclohexane, xylene, methyl ethyl ketone, and toluene. By using any of the dispersion media set forth above, dispersibility of the fluororesin and the fibrous carbon nanostructures in the slurry can be increased, and shapeability of the composite resin material can be further improved.

Moreover, the present disclosure aims to advantageously solve the problem set forth above by disclosing a method of producing a shaped product comprising a step of shaping a composite resin material produced using any one of the methods of producing a composite resin material set forth above. By using a composite resin material produced using any one of the methods of producing a composite resin material set forth above, it is possible to obtain a shaped product for which surface roughness, shaping unevenness, warping, and the like are inhibited and that has good properties.

Advantageous Effect

According to the present disclosure, it is possible to provide a method of producing a composite resin material that has excellent shapeability and enables supply of a shaped product having good properties.

Moreover, according to the present disclosure, it is possible to provide a method of producing a shaped product having good properties.

DETAILED DESCRIPTION

The following provides a detailed description of embodiments of the present disclosure.

The presently disclosed method of producing a composite resin material can be used in production of a composite resin material containing a fluororesin and fibrous carbon nanostructures. Moreover, a composite resin material produced using the presently disclosed method of producing a composite resin material can be used in production of a shaped product using the presently disclosed method of producing a shaped product.

Furthermore, surface roughness, shaping unevenness, and warping are inhibited in a shaped product produced using the presently disclosed method of producing a shaped product, and the shaped product is useful as an integrated circuit tray, a wafer carrier, or a sealing material, for example, but is not specifically limited to these uses.

Method of Producing Composite Resin Material

In the presently disclosed method of producing a composite resin material, a composite resin material containing a fluororesin and fibrous carbon nanostructures is produced. The presently disclosed method of producing a composite resin material includes: a mixing step of mixing a fluororesin, fibrous carbon nanostructures, and a dispersion medium to obtain a slurry; and a formation step of removing the dispersion medium from the slurry obtained in the mixing step and forming a particulate composite resin material having a D50 diameter of at least 20 μm and not more than 500 μm and a D90 diameter/D10 diameter value of at least 1.2 and not more than 15.

Through the presently disclosed method of producing a composite resin material, it is possible to obtain a composite resin material that has excellent shapeability and enables supply of a shaped product having good properties. The reason that a composite resin material obtained through the presently disclosed production method has excellent shapeability is presumed to be as follows. Firstly, the fluororesin and the fibrous carbon nanostructures are initially mixed in the dispersion medium in the mixing step of the presently disclosed method of producing a composite resin material, which enables favorable dispersion of the fibrous carbon nanostructures in a fluororesin matrix in the obtained composite resin material. Moreover, in the formation step of the presently disclosed method of producing a composite resin material, the dispersion medium is removed from the slurry while forming the composite resin material in a particulate form having a D50 diameter of at least 20 μm and not more than 500 μm and a D90 diameter/D10 diameter value of at least 1.2 and not more than 15. A particulate composite resin material such as set forth above has adequate rollability as a result of having a D50 diameter that is within the range set forth above and has small variation in particle diameter as a result of having a D90 diameter/D10 diameter value that is within the range set forth above. Consequently, the composite resin material can, for example, be loaded uniformly into a mold for shaping without unevenness in terms of sparse and dense regions. Therefore, the composite resin material obtained through the presently disclosed production method can be used to obtain a shaped product in which dispersibility of fibrous carbon nanostructures is excellent and in which density unevenness resulting from shaping is inhibited. A shaped product such as set forth above has little surface roughness and shaping unevenness, and is resistant to warping.

<Mixing Step>

In the mixing step, a slurry is prepared by mixing a fluororesin, fibrous carbon nanostructures, a dispersion medium, and optional additives.

[Fluororesin]

The fluororesin may, for example, be polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (ETFE), polychlorotrifluoroethylene (PCTFE), chlorotrifluoroethylene-ethylene copolymer (ECTFE), polyvinylidene fluoride (PVDF), polyvinyl fluoride (PVF), or the like. Of these examples, the fluororesin is preferably PTFE or PFA, and more preferably PTFE. One of these fluororesins may be used individually, or two or more of these fluororesins may be used in combination.

The fluororesin used in the mixing step is preferably fluororesin particles. Fluororesin particles have excellent dispersibility in the slurry. Accordingly, the use of fluororesin particles enables favorable dispersion of the fibrous carbon nanostructures in a fluororesin matrix in the obtained composite resin material and can further improve shapeability of the composite resin material.

The average particle diameter of the fluororesin particles is preferably 1 μm or more, more preferably 5 μm or more, and even more preferably 10 μm or more, and is preferably 700 μm or less, more preferably 250 μm or less, and even more preferably 150 μm or less. Dispersibility of the fibrous carbon nanostructures in the slurry can be further increased when the average particle diameter of the fluororesin particles is 1 μm or more. Moreover, slurry producibility can be improved when the average particle diameter of the fluororesin particles is 700 μm or less.

The "average particle diameter" of fluororesin particles referred to in the present disclosure can be determined by measuring a particle size distribution (volume basis) of the fluororesin particles by laser diffraction and then calculating a particle diameter at which a cumulative value of volume probability density reaches 50%.

The amount of the fluororesin in the slurry (100 mass %) is preferably 1 mass % or more, and more preferably 3 mass % or more, and is preferably 30 mass % or less, and more preferably 25 mass % or less. When the amount of resin particles is within any of the ranges set forth above, dispersibility of the fluororesin and the fibrous carbon nanostructures in the slurry can be increased, and shapeability of the composite resin material can be further improved.

[Fibrous Carbon Nanostructures]

No specific limitations are placed on the fibrous carbon nanostructures. For example, fibrous carbon nanostructures having electrical conductivity may be used. Specific examples of usable fibrous carbon nanostructures include cylindrical carbon nanostructures such as carbon nanotubes (CNTs) and non-cylindrical carbon nanostructures such as carbon nanostructures having a network of 6-membered carbon rings in the form of flattened cylindrical shape. One type of fibrous carbon nanostructure may be used individually, or two or more types of fibrous carbon nanostructures may be used in combination.

Of the above-described examples, fibrous carbon nanostructures including CNTs are preferably used as the fibrous carbon nanostructures. This is because by using fibrous carbon nanostructures that include CNTs, it is possible to efficiently impart properties such as electrical conductivity to a composite resin material and a shaped product even using only a small amount of the fibrous carbon nanostructures.

The fibrous carbon nanostructures including CNTs may be composed of only CNTs or may be a mixture of CNTs and fibrous carbon nanostructures other than CNTs.

The CNTs included among the fibrous carbon nanostructures are not specifically limited and may be single-walled carbon nanotubes and/or multi-walled carbon nanotubes. However, the CNTs are preferably carbon nanotubes having one to five walls, and are more preferably single-walled carbon nanotubes. This is because composite resin material and shaped product properties such as electrical conductivity can be improved using a smaller amount of carbon nanotubes when carbon nanotubes having fewer walls are used.

The average diameter of the fibrous carbon nanostructures is preferably 1 nm or more, and is preferably 60 nm or less, more preferably 30 nm or less, and even more preferably 10 nm or less. Dispersibility of the fibrous carbon nanostructures can be increased and properties such as electrical conductivity can be imparted to a composite resin material and a shaped product in a stable manner when the average diameter of the fibrous carbon nanostructures is 1 nm or more. Moreover, properties such as electrical conductivity can be efficiently imparted to a composite resin material and a shaped product even using only a small amount of fibrous carbon nanostructures when the average diameter of the fibrous carbon nanostructures is 60 nm or less.

The "average diameter of fibrous carbon nanostructures" referred to in the present disclosure can be determined by measuring the diameters (external diameters) of 20 fibrous carbon nanostructures, for example, in a transmission electron microscope (TEM) image and then calculating a number-average value of the diameters.

The fibrous carbon nanostructures are preferably fibrous carbon nanostructures for which a ratio $3\sigma/Av$ of a value $3\sigma$ (value obtained by multiplying the diameter standard deviation ($\sigma$: sample standard deviation) by 3) relative to the average diameter Av is more than 0.20 and less than 0.60, more preferably fibrous carbon nanostructures for which $3\sigma/Av$ is more than 0.25, and even more preferably fibrous carbon nanostructures for which $3\sigma/Av$ is more than 0.40. Performance of a produced composite resin material and shaped product can be further improved when fibrous carbon nanostructures for which $3\sigma/Av$ is more than 0.20 and less than 0.60 are used.

The average diameter Av and the standard deviation $\sigma$ of the fibrous carbon nanostructures may be adjusted by altering the production method and the production conditions of the fibrous carbon nanostructures, or by combining a plurality of types of fibrous carbon nanostructures obtained by different production methods.

The fibrous carbon nanostructures that are used typically take a normal distribution when a plot is made of diameter measured as described above on a horizontal axis and probability density thereof on a vertical axis, and a Gaussian approximation is made.

The average length of the fibrous carbon nanostructures is preferably 10 μm or more, more preferably 50 μm or more, and even more preferably 80 μm or more, and is preferably 600 μm or less, more preferably 550 μm or less, and even more preferably 500 μm or less. A conduction path can be formed in a composite resin material and a shaped product using a small amount of fibrous carbon nanostructures and dispersibility of the fibrous carbon nanostructures can be improved when the average length thereof is 10 μm or more. Moreover, electrical conductivity of a composite resin material and a shaped product can be stabilized when the average length is 600 μm or less. Therefore, shaped product surface resistivity can be sufficiently reduced when the average length of the fibrous carbon nanostructures is within any of the ranges set forth above.

The average length of "fibrous carbon nanostructures" referred to in the present disclosure can be determined by measuring the lengths of 20 fibrous carbon nanostructures, for example, in a scanning electron microscope (SEM) image and then calculating a number-average value of the lengths.

The fibrous carbon nanostructures normally have an aspect ratio of more than 10. The aspect ratio of the fibrous carbon nanostructures can be determined by measuring the diameters and lengths of 100 randomly selected fibrous carbon nanostructures using a scanning electron microscope or a transmission electron microscope, and then calculating an average value for the ratio of diameter and length (length/diameter).

The BET specific surface area of the fibrous carbon nanostructures is preferably 200 m$^2$/g or more, more preferably 400 m$^2$/g or more, and even more preferably 600 m$^2$/g or more, and is preferably 2,000 m$^2$/g or less, more preferably 1,800 m$^2$/g or less, and even more preferably 1,600 m$^2$/g or less. When the BET specific surface area of the fibrous carbon nanostructures is 200 m$^2$/g or more, dispersibility of the fibrous carbon nanostructures can be increased, and composite resin material and shaped product properties such as electrical conductivity can be sufficiently enhanced using a small amount of the fibrous carbon nanostructures. Moreover, composite resin material and shaped product properties such as electrical conductivity can be stabilized when the BET specific surface area of the fibrous carbon nanostructures is 2,000 m$^2$/g or less.

Herein, the term "BET specific surface area" refers to nitrogen adsorption specific surface area measured by the BET method.

The fibrous carbon nanostructures preferably exhibit a convex upward shape in a t-plot obtained from an adsorption isotherm. The t-plot can be obtained from an adsorption isotherm of the fibrous carbon nanostructures measured by a nitrogen gas adsorption method by converting relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructures (t-plot method of de Boer et al.).

In the case of a material having pores at the surface thereof, growth of the adsorbed layer of nitrogen gas is categorized into the following processes (1) to (3). The gradient of the t-plot changes in accordance with processes (1) to (3).

(1) A process in which a single molecular adsorption layer of nitrogen molecules is formed over the entire surface (2) A process in which a multi-molecular adsorption layer is formed and is accompanied by capillary condensation filling of pores (3) A process in which a multi-molecular adsorption layer is formed at a surface that appears to be non-porous due to the pores being filled by nitrogen The t-plot forming a convex upward shape is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that there is a large number of openings in carbon nanostructures constituting the fibrous carbon nanostructures.

A bending point of the t-plot for the fibrous carbon nanostructures is preferably within a range of 0.2≤t (nm) ≤1.5, more preferably within a range of 0.45≤t (nm)≤1.5, and even more preferably within a range of 0.55≤t (nm)≤1.0. When the bending point of the t-plot for the fibrous carbon nanostructures is within any of the ranges set forth above, dispersibility of the fibrous carbon nanostructures can be increased, and composite resin material and shaped product properties such as electrical conductivity can be enhanced using a small amount of the fibrous carbon nanostructures. Specifically, the fibrous carbon nanostructures may readily aggregate and dispersibility may decrease if the value of the bending point is less than 0.2, whereas the fibrous carbon nanostructures may easily become entangled with one another and dispersibility may decrease if the value of the bending point is more than 1.5.

The "position of the bending point" is defined as an intersection point of a linear approximation A for the above-described process (1) and a linear approximation B for the above-described process (3).

The fibrous carbon nanostructures preferably have a ratio (S2/S1) of internal specific surface area S2 relative to total specific surface area S1 obtained from the t-plot of at least 0.05 and not more than 0.30. When the value of S2/S1 of the fibrous carbon nanostructures is within the range set forth above, dispersibility of the fibrous carbon nanostructures can be increased, and composite resin material and shaped product properties such as electrical conductivity can be enhanced using a small amount of the fibrous carbon nanostructures.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of total specific surface area S1 and internal specific surface area S2 based on t-plot analysis can be performed, for example, using a BELSORP®-mini (BELSORP is a registered trademark in Japan, other countries, or both), which is a commercially available measurement apparatus produced by Bel Japan Inc.

Moreover, it is preferable that the fibrous carbon nanostructures including CNTs that are preferable as the fibrous carbon nanostructures have a radial breathing mode (RBM) peak when evaluated by Raman spectroscopy. It should be noted that an RBM is not present in the Raman spectrum of fibrous carbon nanostructures composed only of multi-walled carbon nanotubes having three or more walls.

In a Raman spectrum of the fibrous carbon nanostructures including CNTs, a ratio of G band peak intensity relative to D band peak intensity (G/D ratio) is preferably at least 0.5 and not more than 5.0. Performance of a produced composite resin material and shaped product can be further improved when the G/D ratio is at least 0.5 and not more than 5.0.

The fibrous carbon nanostructures including CNTs can be produced by a known CNT synthetic method such as arc discharge, laser ablation, or chemical vapor deposition (CVD) without any specific limitations. Specifically, the fibrous carbon nanostructures including CNTs can, for example, be efficiently produced in accordance with a method in which, during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve the catalytic activity of the catalyst layer (super growth method; refer to WO 2006/011655 A1). Hereinafter, carbon nanotubes that are obtained by the super growth method are also referred to as "SGCNTs".

The fibrous carbon nanostructures produced by the super growth method may be composed of only SGCNTs or may include other carbon nanostructures such as non-cylindrical carbon nanostructures in addition to SGCNTs.

The amount of the fibrous carbon nanostructures in the slurry per 100 parts by mass of the previously described fluororesin is preferably 0.01 parts by mass or more, and more preferably 0.02 parts by mass or more, and is preferably 10 parts by mass or less, and more preferably 8 parts by mass or less. When the amount of the fibrous carbon nanostructures is at least any of the lower limits set forth above, composite resin material and shaped product properties such as electrical conductivity can be enhanced. Moreover, the occurrence of non-uniformity of properties such as electrical conductivity of a shaped product due to reduced dispersibility of the fibrous carbon nanostructures can be inhibited when the amount of the fibrous carbon nanostructures is not more than any of the upper limits set forth above.

[Dispersion Medium]

Examples of the dispersion medium include, but are not specifically limited to, polar solvents such as water, ketones (for example, methyl ethyl ketone (MEK)), and alcohols (for example, ethanol and isopropyl alcohol); and non-polar solvents such as hydrocarbon solvents (for example, cyclohexane, toluene, and xylene). One of these solvents may be used individually, or two or more of these solvents may be used in combination in a freely selected ratio.

Of these solvents, it is preferable to use at least one selected from the group consisting of cyclohexane, xylene, methyl ethyl ketone, and toluene as the dispersion medium, and more preferable to use cyclohexane as the dispersion medium from a viewpoint of improving dispersibility of components in the slurry.

[Additives]

No specific limitations are placed on additives that may optionally be contained in the mixed liquid and examples thereof include known additives such as dispersants.

Examples of dispersants that may be used include known dispersants that can assist dispersion of fibrous carbon nanostructures. Specifically, a surfactant, a polysaccharide, a π-conjugated polymer, a polymer including an ethylene chain as a main chain, or the like may be used as a dispersant. Of these dispersants, a surfactant is more preferable.

The amount of additives per 100 parts by mass of the previously described fluororesin is preferably 1 part by mass or less, and more preferably 0 parts by mass (i.e., the slurry does not contain additives) from a viewpoint of suppressing reduction of electrical conductivity of a composite resin material and a shaped product.

[Mixing Method]

No specific limitations are placed on the method by which the above-described fluororesin, fibrous carbon nanostructures, dispersion medium, and optional additives are mixed to obtain the slurry. For example, the slurry is preferably prepared through a premixing step of mixing the fluororesin, the fibrous carbon nanostructures, the dispersion medium, and the optional additives to obtain a premixed liquid and a dispersing step of subjecting the obtained premixed liquid to dispersion treatment using a wet disperser from a viewpoint of increasing dispersibility of the fluororesin and the fibrous carbon nanostructures in the slurry and further improving shapeability of a composite resin material.

Premixing Step

Known mixing methods can be adopted as the method by which the above-described fluororesin, fibrous carbon nanostructures, dispersion medium, and optional additives are mixed to obtain the premixed liquid without any specific limitations. Among such methods, a method in which mixing of the components set forth above is performed using a stirrer without application of pressure is preferable from a viewpoint of inhibiting damage to the fibrous carbon nanostructures.

No specific limitations are placed on the order in which the components set forth above are mixed. For example, all of the components may be mixed at once, or some of the components may be mixed and then the remainder of the components may be added and further mixed therewith. Of these examples, mixing of all of the components at once is preferable from a viewpoint of preparing a mixed liquid through a simple operation.

The proportions in which components are contained in the premixed liquid are normally the same as the proportions in which the components are contained in the slurry.

Dispersing Step

In the dispersing step, the premixed liquid obtained in the premixing step is supplied to a wet disperser and is subjected to dispersion treatment to obtain a slurry.

Although no specific limitations are placed on the wet disperser used in the dispersion treatment so long as it is a disperser that can disperse the fluororesin, the fibrous carbon nanostructures, and so forth in the dispersion medium, the wet disperser is preferably a wet medialess disperser.

Known medialess dispersers that can perform wet dispersion treatment without using dispersing media (for example, a high speed stirrer, a homogenizer, or an inline mixer) may be used as the wet medialess disperser. From a viewpoint of inhibiting damage to the fibrous carbon nanostructures and favorably dispersing the fibrous carbon nanostructures, the wet medialess disperser is preferably a homogenizer or an inline mixer, and is more preferably a rotary homogenizer or an inline rotor-stator mixer including a fixed stator and a rotor that rotates at high speed in opposition to the stator.

The pressure acting on the mixed liquid in the dispersing step (i.e., the pressure acting on the mixed liquid between supply thereof to the wet medialess disperser and the end of the dispersion treatment) is preferably 5 MPa or less, and more preferably 4 MPa or less. Even more preferably, the dispersion treatment of the mixed liquid is performed without application of pressure. This is because dispersibility of the fluororesin (particularly fluororesin particles) can be ensured, damage to the fibrous carbon nanostructures can be inhibited, and deterioration of composite resin material and shaped product properties such as electrical conductivity can be suppressed when the pressure acting on the mixed liquid is not more than any of the upper limits set forth above.

In a case in which a rotary homogenizer is used as the wet medialess disperser, it is preferable that dispersion treatment is performed under conditions in which the impeller circumferential speed is 5 m/s or more. The fibrous carbon nanostructures can be sufficiently dispersed when the impeller circumferential speed is 5 m/s or more. The treatment time is preferably at least 10 minutes and not more than 300 minutes. Moreover, it is preferable that appropriate shear force is imparted on the mixed liquid, and the shape of a rotating part of the homogenizer is preferably a serrated blade, a closed type rotor, or a rotor/stator type, for example. The slit width of the closed type rotor or the rotor/stator clearance is preferably 3 mm or less, and more preferably 1 mm or less.

Moreover, in a case in which an inline rotor-stator mixer is used as the wet medialess disperser, the dispersion treatment is preferably performed under conditions in which the impeller circumferential speed is 5 m/s or more.

The fibrous carbon nanostructures can be sufficiently dispersed when the impeller circumferential speed is 5 m/s or more. The number of times that the liquid mixture passes a rotating part of the mixer is preferably 10 or more. Through 10 or more passes, the fibrous carbon nanostructures can be uniformly and favorably dispersed. The treatment time is preferably at least 10 minutes and not more than 300 minutes. Moreover, it is preferably that appropriate shear force is imparted on the mixed liquid, and the shape of the rotating part is preferably a slit type, for example. The rotor/stator clearance is preferably 3 mm or less, and more preferably 1 mm or less. Moreover, the slit width is preferably 2 mm or less, and more preferably 1 mm or less.

[Slurry]

The slurry obtained in the mixing step set forth above contains a fluororesin, fibrous carbon nanostructures, a dispersion medium, and optional additives. In a case in which fluororesin particles are used as the fluororesin, the fluororesin may maintain a particulate form in the obtained slurry or may be in a form other than a particulate form in the slurry.

The viscosity of the obtained slurry is preferably 50 mPa·s or more, and more preferably 100 mPa·s or more, and is preferably 3,000 mPa·s or less, and more preferably 2,500 mPa·s or less. When the viscosity of the slurry is within any of the ranges set forth above, handleability of the slurry can be ensured, and a composite resin material having desired properties can efficiently be produced in the subsequent formation step.

The viscosity of the slurry can be measured using a B-type viscometer under conditions of a temperature of 25° C. and a rotation speed of 60 rpm.

<Formation Step>

In the formation step, the dispersion medium is removed from the slurry obtained in the mixing step set forth above and a particulate composite resin material having a D50 diameter of at least 20 μm and not more than 500 μm and a D90 diameter/D10 diameter value of at least 1.2 and not more than 15 is formed.

[Preparation Method of Particulate Composite Resin Material]

The method by which the particulate composite resin material having the desired particle diameter distribution set forth above is obtained is not specifically limited and may, for example, be either of the following methods (i) and (ii).

(i) A method in which drying granulation of the slurry is performed to obtain a particulate composite resin material (ii) A method in which a dried product obtained through drying of the slurry is milled, and the resultant milled product is sifted to obtain a particulate composite resin material Of these methods, method (i) is preferable from a viewpoint of efficiently obtaining a particulate composite resin material having the desired particle diameter distribution.

The drying granulation in method (i) is preferably spray drying. The method of spraying in the spray drying is preferably atomizer spraying (centrifugal spraying), pressure nozzle spraying, or bottom spraying. The temperature of hot air used in drying (hot air temperature) is preferably at least 40° C. and not higher than 120° C. A hot air temperature of 40° C. or higher enables sufficient drying, whereas a hot air temperature of 120° C. or lower can inhibit excessive non-uniformity of particle diameter of the obtained composite resin material. The hot air temperature can be measured at a blowing port (inlet) from which hot air is blown to a drying section where drying is performed in a dryer (for example, a spray dryer).

[Properties of Particulate Composite Resin Material]

The D50 diameter of the particulate composite resin material obtained by the method set forth above is required to be at least 20 μm and not more than 500 μm, is preferably 30 μm or more, and more preferably 40 μm or more, and is preferably 400 μm or less, and more preferably 300 μm or less. If the D50 diameter of the composite resin material deviates from the range set forth above, shapeability cannot be ensured because of deterioration of rollability, and surface roughness, shaping unevenness, and warping cannot be sufficiently inhibited in a shaped product obtained from the composite resin material. In particular, in a composite resin material having a D50 of less than 20 μm, the dimensions of fluororesin particles and the dimensions over which chains of the fibrous carbon nanostructures spread have similar values, and this results in broadening of the particle size distribution of the particulate composite resin material and may cause the D90 diameter/D10 diameter to deviate from the preferred numerical range.

The D50 diameter of the composite resin material can be adjusted by altering the viscosity of the slurry, the spraying pressure in spray drying, and so forth.

The D90 diameter/D10 diameter value of the composite material is required to be at least 1.2 and not more than 15, is preferably 1.3 or more, and more preferably 1.5 or more, and is preferably 12 or less, more preferably 10 or less, and even more preferably 5 or less. If the D90 diameter/D10 diameter value of the composite resin material exceeds 15, there is large variation in particle diameter of the composite resin material and shapeability of the composite resin material cannot be ensured. On the other hand, if the D90 diameter/D10 diameter value is less than 1.2, interparticle gaps increase, leading to higher porosity and uneven filling.

By using spray drying, it is easy to obtain a particulate composite resin material having a D90 diameter/D10 diameter value that is within any of the ranges set forth above. Moreover, the D90 diameter/D10 diameter value can be reduced by using a sieve to remove small particle diameter particles and/or large particle diameter particles.

(Method of Producing Shaped Product)

The presently disclosed method of producing a shaped product includes a step of shaping the composite resin material produced using the presently disclosed method of producing a composite resin material. As a result of the particulate composite resin material having the specific particle diameter distribution set forth above being used in the presently disclosed method of producing a shaped product, a shaped product in which surface roughness, shaping unevenness, and warping are inhibited and that has good properties can be obtained.

Known shaping methods such as compression molding can be used without any specific limitations as the method by which the composite resin material is shaped. The shaped product obtained through shaping of the composite resin material may optionally be subjected to firing treatment.

EXAMPLES

The following provides a more specific description of the present disclosure based on examples. However, the present disclosure is not limited to the following examples.

In the examples and comparative example, the following methods were used to measure and evaluate the particle diameter distribution of a composite resin material and density unevenness of a shaped product.

<Particle Diameter Distribution>

The particle diameter distribution of a composite resin material was measured as a volume-basis particle diameter distribution using a laser diffraction/scattering particle diameter distribution measurement apparatus (produced by Seishin Enterprise Co., Ltd.; product name: LMS-2000e) and a dry dispersing unit. Values for the D10 diameter, the D50 diameter, and the D90 diameter were determined from particle diameters corresponding to cumulative values of 10%, 50%, and 90% in the dry particle diameter distribution, and a D90 diameter/D10 diameter value was calculated.

<Density Unevenness of Shaped Product>

An obtained shaped product in the form of a sheet was divided equally into 9 pieces, and the density of each test piece was measured in accordance with JIS K6268. An average value, standard deviation, and coefficient of variation of the measured densities were calculated in order to evaluate density unevenness of the shaped product. A smaller coefficient of variation indicates smaller density unevenness and better composite resin material shapeability.

Example 1

A 10 L SUS (stainless steel) can was charged with 4,000 g of cyclohexane as a dispersion medium, 1,000 g of fluororesin particles (produced by Daikin Industries, Ltd.; PTFE (polytetrafluoroethylene) molding powder; product name: POLYFLON PTFE-M12; average particle diameter: 50 m; specific gravity: 2.16), and 1 g of carbon nanotubes (produced by ZEON Corporation; product name: ZEO-NANO SG101; single-walled CNTs; specific gravity: 1.7; average diameter: 3.5 nm; average length: 400 μm; BET specific surface area: 1,050 $m^2/g$; G/D ratio: 2.1; convex upward shaped t-plot) as fibrous carbon nanostructures. Stirring was performed for 60 minutes at 20° C. and a rotation speed of 15,600 rpm (impeller circumferential speed: 34.7 m/s) using a CAVITRON (produced by Pacific Machinery & Engineering Co., Ltd.; product name: CD1000; rotor/stator: slit type; slit width: 0.4 mm), which is an inline mixer, to obtain a slurry containing fluororesin particles and carbon nanotubes. The viscosity of the slurry was 1,900 mPa·s.

Next, the obtained slurry containing fluororesin particles and carbon nanotubes was spray dried by centrifugal spraying using a spray dryer (produced by PRECI Co., Ltd.; product name: TR160) under conditions of a hot air temperature of 90° C. and a rotation speed of 10,000 rpm to obtain particles of a composite (composite resin material) of a fluororesin and carbon nanotubes. A particle diameter distribution of the particles of the obtained composite (composite resin material) was measured. The results are shown in Table 1. Next, the particles of the composite (composite resin material) were loaded into a mold and then shaping was performed using a compression molding machine (produced by Dumbbell Co., Ltd.; model no.: SDOP-1032IV-2HC-AT) under conditions of a temperature of 20° C., a pressure of 21 MPa, and a pressure holding time of 5 minutes to obtain a shaped product in the form of a sheet of 130 mm (length)×80 mm (width)×20 mm (thickness). Density unevenness was evaluated using the obtained shaped product. The results are shown in Table 1.

Example 2

A slurry, particles of a composite (composite resin material), and a shaped product were produced in the same way as in Example 1 with the exception that the hot air temperature of the spray dryer was changed to 60° C. Evaluations were performed in the same way as in Example 1. The results are shown in Table 1.

Example 3

A slurry containing fluororesin particles and carbon nanotubes that was obtained in the same way as in Example 1 was vacuum dried for 12 hours at 70° C. using a 100 L rotating vessel-type vacuum dryer to obtain a composite (composite resin material) of a fluororesin and carbon nanotubes. Next, a Quick Mill (produced by Seishin Enterprise Co., Ltd.; product name: QMY-30), which is a milling granulator, was used to perform milling under conditions of a 1 mm screen and a rotation speed of 60 Hz, and then sifting was performed using a 60 mesh sieve to obtain particles of the composite (composite resin material). A shaped product was produced in the same way as in Example 1 with the exception that the obtained particles of the composite (composite resin material) were used. Evaluations were performed in the same way as in Example 1. The results are shown in Table 1.

Comparative Example 1

Particles of a composite (composite resin material) and a shaped product were produced in the same way as in Example 3 with the exception that sifting was not performed. Evaluations were performed in the same way as in Example 1. The results are shown in Table 1.

TABLE 1

| | | Example 1 | Example 2 | Example 3 | Comparative Example 1 |
|---|---|---|---|---|---|
| Production method | Drying | Spray drying | Spray drying | Vacuum drying | Vacuum drying |
| | Granulation | | | Milling + sifting | Milling |
| Particle diameter distribution | D50 diameter (μm) | 110 | 131 | 210 | 246 |
| | D90 diameter/D10 diameter (—) | 2.6 | 4.1 | 3.0 | 25.8 |
| Evaluation | Average density (g/cm³) | 2.10 | 2.08 | 2.06 | 2.06 |
| | Standard deviation (g/cm³) | 0.04 | 0.06 | 0.07 | 0.11 |
| | Coefficient of variation (%) | 1.9 | 2.9 | 3.4 | 5.2 |

It can be seen from Table 1 that in Examples 1 to 3 in which particles of a composite (composite resin material) having a D50 diameter and a D90 diameter/D10 diameter value that were within specific ranges were used, the value of the coefficient of variation expressing density distribution of the shaped product was small and shapeability was excellent. In contrast, the coefficient of variation expressing density distribution of the shaped product had a large value and shapeability was poor in Comparative Example 1 in which particles of a composite (composite resin material) having a large D90 diameter/D10 diameter value were used.

INDUSTRIAL APPLICABILITY

According to the present disclosure, it is possible to provide a method of producing a composite resin material that has excellent shapeability and enables supply of a shaped product having good properties.

Moreover, according to the present disclosure, it is possible to provide a method of producing a shaped product having good properties.

The invention claimed is:

1. A method of producing a composite resin material comprising:
   a mixing step of mixing a fluororesin, fibrous carbon nanostructures, and a dispersion medium to obtain a slurry; and
   a formation step of removing the dispersion medium from the slurry and forming a particulate composite resin material, wherein
   the particulate composite resin material has a D50 diameter of at least 20 μm and not more than 500 μm and a D90 diameter/D10 diameter value of at least 1.2 and not more than 15, where the D10 diameter, D50 diameter, and D90 diameter are particle diameters respectively corresponding to cumulative volumes of 10%, 50%, and 90% calculated in a particle diameter distribution of the particulate composite resin material,
   wherein content of the fluororesin in the slurry is at least 1 mass % and not more than 30 mass %.

2. The method of producing a composite resin material according to claim 1, wherein the mixing step includes:
   a premixing step of mixing the fluororesin, the fibrous carbon nanostructures, and the dispersion medium to obtain a premixed liquid; and
   a dispersing step of subjecting the premixed liquid to dispersion treatment using a wet disperser to obtain a slurry.

3. The method of producing a composite resin material according to claim 2, wherein the wet disperser is a wet medialess disperser.

4. The method of producing a composite resin material according to claim 3, wherein the wet medialess disperser is a homogenizer or an inline mixer.

5. The method of producing a composite resin material according to claim 1, wherein the fluororesin is fluororesin particles.

6. The method of producing a composite resin material according to claim 1, wherein the dispersion medium is at least one selected from the group consisting of cyclohexane, xylene, methyl ethyl ketone, and toluene.

7. A method of producing a shaped product comprising a step of shaping the composite resin material obtained from the method according to claim 1.

* * * * *